(12) United States Patent
Ozsobaci (10) Patent No.: US 10,166,738 B2
(45) Date of Patent: Jan. 1, 2019

(54) FLYING SPLICE TAPE WITH RESIDUE-FREE FASTENER FOR WOVEN AND NONWOVEN FIBROUS MATERIALS

(71) Applicant: tesa SE, Norderstedt (DE)

(72) Inventor: Metin Ozsobaci, Chicago, IL (US)

(73) Assignee: TESA SE, Norderstedt (DE)

(*) Notice: Subject to any disclaimer, the term of this patent is extended or adjusted under 35 U.S.C. 154(b) by 1 day.

(21) Appl. No.: 15/589,511

(22) Filed: May 8, 2017

(65) Prior Publication Data

US 2018/0319122 A1    Nov. 8, 2018

(51) Int. Cl.

| B65H 19/18 | (2006.01) |
|---|---|
| B32B 3/14 | (2006.01) |
| B32B 5/02 | (2006.01) |
| B65H 19/10 | (2006.01) |
| C09J 7/29 | (2018.01) |

(52) U.S. Cl.
CPC ............... *B32B 3/14* (2013.01); *B32B 5/022* (2013.01); *B32B 5/024* (2013.01); *B65H 19/102* (2013.01); *B65H 19/181* (2013.01); *B65H 19/1815* (2013.01); *B32B 2405/00* (2013.01); *B65H 2301/46066* (2013.01); *B65H 2301/46072* (2013.01)

(58) Field of Classification Search
CPC ............... B65H 19/102; B65H 19/181; B65H 19/1815; B65H 19/1821; B65H 2301/46066; B65H 2301/46072
See application file for complete search history.

(56) References Cited

U.S. PATENT DOCUMENTS

| 6,790,302 B2* | 9/2004 | Beck ................... B65H 19/102 156/157 |
| 7,240,874 B2* | 7/2007 | Eikmeier ............. B65H 19/102 242/555.3 |
| 7,255,764 B2* | 8/2007 | Weinberg ............. B65H 19/102 156/187 |
| 7,264,194 B2* | 9/2007 | Gassner ............... B65H 19/102 242/555.3 |
| 2009/0117310 A1* | 5/2009 | Ellringmann ............ C09J 7/381 428/42.2 |
| 2009/0266475 A1* | 10/2009 | Wulf ................... B65H 19/102 156/157 |

* cited by examiner

*Primary Examiner* — Mark A Osele
(74) *Attorney, Agent, or Firm* — McGuireWoods LLP (57) ABSTRACT

Provided are adhesive tapes and methods of use. The adhesive tape provides a flying splice of fibrous materials. An example adhesive tape comprises an adhesive layer, a backing adjacent to the adhesive layer, and a non-adhesive mechanical fastener.

11 Claims, 7 Drawing Sheets

FLYING SPLICE TAPE WITH RESIDUE-FREE FASTENER FOR WOVEN AND NONWOVEN FIBROUS MATERIALS

TECHNICAL FIELD

The present disclosure relates to adhesive tapes used for making flying splices, and more particularly, to single-sided and double-sided adhesive tapes comprising a non-adhesive mechanical fastener that does not leave a residue on woven or nonwoven fibrous materials.

BACKGROUND

A flying splice is a method of splicing a new roll of a material to an expiring roll of material as the expiring roll is almost completely unwound. The method is described as "flying" or "on-the-fly" because the splice is made without the need to stop or slow down the unwinding of the expiring roll of the material.

Flying splice operations may be of particular importance to the woven and nonwoven materials industries. In some of these industries, for example, the diaper industry, many different types of materials are unwound and incorporated into the final product. Typically, several unwinding machines may be needed to unwind the various distinct materials. The large amount of unwinding machines may result in manufacturers making a large number of flying splices on the different materials in order to maintain continuous production. A flying splice typically uses an adhesive tape to splice the leading edge of a new roll of material to an almost completely unwound expiring roll of material. The flying splice adhesive tape may also use a type of fastener known as a splittable adhesive system to adhere the leading edge of the top winding of the new roll to the second from the top winding of the new roll. The splittable adhesive system thus prevents the premature unwinding of the leading edge of the new roll when the new roll is brought to the approximate rotational speed of the expiring roll in order to perform the flying splice operation. After the flying splice is made, the splittable adhesive system may then split, as the leading edge is unwound from the new roll. An adhesive residue may remain on the second from the top winding of the new roll when the splittable adhesive system is split. With every flying splice made, the portion of the new roll comprising the flying splice and the adhesive residue is separated and removed to ensure that the spliced section and the residue section are not sent to consumers. Removing this amount of product for every splice made reduces the amount of product produced and also generates waste.

Additionally, some of the woven and nonwoven materials may be difficult to bond due to their varying surface characteristics. Generally, the contact area of the adhesive of the splittable adhesive system is much smaller than that of the contact area of the splice adhesive layer. As such, it may be difficult to find a common adhesive sufficient to bond each of these different materials with an adhesive that is localized to a reduced contact area, which is typical of the splittable adhesive systems.

SUMMARY

In an embodiment, an adhesive tape is provided. The adhesive tape provides a flying splice of fibrous materials. The adhesive tape comprises an adhesive layer, a backing adjacent to the adhesive layer, and a non-adhesive mechanical fastener.

Additionally or alternatively, the adhesive tape may include one or more of the following features individually or in combination: the non-adhesive mechanical fastener may comprise a shaped plastic; the plastic of the shaped plastic may be selected from the group consisting of nylons, polyesters, polyurethanes, polyvinyl chloride, polypropylene, and any combination thereof; the shape of the shaped plastic may be selected from the group consisting of a single-sided hook shape, a half-sphere capped shape, a branched tree shape, a double-sided hook shape, a sphere capped shape, an open-loop shape, an arrow shape, a triangle capped shape, and any combination thereof; the non-adhesive mechanical fastener may be positioned adjacent to the backing and positioned on the opposing side of the backing relative to the adhesive layer; the adhesive tape may further comprise a leading edge liner adjacent to and covering at least a portion of the adhesive layer; the adhesive tape may further comprise a contact side liner adjacent to and covering at least a portion of the adhesive layer; the adhesive layer may be a first adhesive layer, and the adhesive tape may further comprise a second adhesive layer adjacent to the backing and positioned on the opposing side of the backing relative to the first adhesive layer; the non-adhesive mechanical fastener may be positioned adjacent to the second adhesive layer on the opposing side of the second adhesive layer relative to the backing.

In an embodiment, a roll of fibrous material is provided. The roll of fibrous material comprises a first length of fibrous material; and a second length of fibrous material spliced to the first length of fibrous material. The second length of fibrous material may be spliced to the first length of fibrous material by attaching an adhesive tape to a leading edge of the first length of the fibrous material. The adhesive tape may comprise an adhesive layer, a liner adjacent to and covering at least a portion of the adhesive layer, a backing adjacent to the adhesive layer, and a non-adhesive mechanical fastener. The non-adhesive mechanical fastener may be fastened to the first length of the fibrous material. The adhesive tape may contact the second length of the fibrous material. The non-adhesive mechanical fastener may be released from the first length of the fibrous material; wherein the released non-adhesive mechanical fastener does not leave a residue on the first roll of the fibrous material.

Additionally or alternatively, the adhesive tape may include one or more of the following features individually or in combination: the non-adhesive mechanical fastener may comprise a shaped plastic; the plastic of the shaped plastic may be selected from the group consisting of nylons, polyesters, polyurethanes, polyvinyl chloride, polypropylene, and any combination thereof; the shape of the shaped plastic may be selected from the group consisting of a single-sided hook shape, a half-sphere capped shape, a branched tree shape, a double-sided hook shape, a sphere capped shape, an open-loop shape, an arrow shape, a triangle capped shape, and any combination thereof; the non-adhesive mechanical fastener may be positioned adjacent to the backing and positioned on the opposing side of the backing relative to the adhesive layer; the liner may further comprise a leading edge liner adjacent to and covering at least a portion of the adhesive layer; the liner may further comprise a contact side liner adjacent to and covering at least a portion of the adhesive layer; the adhesive layer may be a first adhesive layer, and the adhesive tape may further comprise a second adhesive layer adjacent to the backing and positioned on the opposing side of the backing relative to the first adhesive layer; the non-adhesive mechanical fastener may be positioned adjacent to the second adhesive layer on the opposing side of the second adhesive layer relative to the backing.

In an embodiment, a method of providing a flying splice on a fibrous material is provided. The method comprises providing an adhesive tape comprising: an adhesive layer, a backing adjacent to the adhesive layer, and a non-adhesive mechanical fastener. The method further comprises contacting the adhesive layer to a leading edge of a top winding of a first roll of the fibrous material. The method further comprises fastening the non-adhesive mechanical fastener to a second from the top winding of the first roll of the fibrous material. The method further comprises contacting the adhesive layer with an unwinding second roll of the fibrous material without stopping or slowing the unwinding of the second roll of the fibrous material. The method further comprises releasing the non-adhesive mechanical fastener from the second from the top winding of the first roll of the fibrous material; wherein the released non-adhesive mechanical fastener does not leave a residue on the second from the top winding of the first roll of the fibrous material.

Additionally or alternatively, the method may include one or more of the following features individually or in combination: the non-adhesive mechanical fastener may comprise a shaped plastic; the plastic of the shaped plastic may be selected from the group consisting of nylons, polyesters, polyurethanes, polyvinyl chloride, polypropylene and any combination thereof; the shape of the shaped plastic may be selected from the group consisting of a single-sided hook shape, a half-sphere capped shape, a branched tree shape, a double-sided hook shape, a sphere capped shape, an open-loop shape, an arrow shape, a triangle capped shape, and any combination thereof; the fibrous material may be selected from the group consisting of textiles, cloth, fabric, wool, silk, cotton, flax, jute, nylon, polyester, acrylic, fur, spunlaid materials, spun-melt materials, spun-melt-spun materials, rayon, polyethylene terephthalate fibers, polypropylene fibers, staple nonwovens, flashspun materials, air-laid paper, fibrillated materials, and any combination thereof; the adhesive tape may further comprise a leading edge liner and a contact side liner; wherein the leading edge liner and the contact side liner are adjacent to and covering at least a portion of the adhesive layer.

In an embodiment, a method of providing a flying splice on a fibrous material is provided. The method comprises providing an adhesive tape comprising: a first adhesive layer, a second adhesive layer, a backing adjacent to the first adhesive layer and the second adhesive layer, and a non-adhesive mechanical fastener. The method further comprises contacting the second adhesive layer to a leading edge of a top winding of a first roll of the fibrous material. The method further comprises fastening the non-adhesive mechanical fastener to a second from the top winding of the first roll of the fibrous material. The method further comprises contacting the first adhesive layer with an unwinding second roll of the fibrous material without stopping or slowing the unwinding of the second roll of the fibrous material. The method further comprises releasing the non-adhesive mechanical fastener from the second from the top winding of the first roll of the fibrous material; wherein the released non-adhesive mechanical fastener does not leave a residue on the second from the top winding of the first roll of the fibrous material.

Additionally or alternatively, the method may include one or more of the following features individually or in combination: the non-adhesive mechanical fastener may comprise a shaped plastic; the plastic of the shaped plastic may be selected from the group consisting of nylons, polyesters, polyurethanes, polyvinyl chloride, polypropylene and any combination thereof; the shape of the shaped plastic may be selected from the group consisting of a single-sided hook shape, a half-sphere capped shape, a branched tree shape, a double-sided hook shape, a sphere capped shape, an open-loop shape, an arrow shape, a triangle capped shape, and any combination thereof; the fibrous material may be selected from the group consisting of textiles, cloth, fabric, wool, silk, cotton, flax, jute, nylon, polyester, acrylic, fur, spunlaid materials, spun-melt materials, spun-melt-spun materials, rayon, polyethylene terephthalate fibers, polypropylene fibers, staple nonwovens, flashspun materials, air-laid paper, fibrillated materials, and any combination thereof.

The present disclosure and advantages associated therewith will become readily apparent in view of the detailed description provided below, including the accompanying drawings.

BRIEF DESCRIPTION OF THE DRAWINGS

Illustrative examples of the present disclosure are described in detail below with reference to the attached drawing figures, which are incorporated by reference herein, and wherein.

The illustrated figures are exemplary only and are not intended to assert or imply any limitation with regard to the environment, architecture, design, or process in which different examples may be implemented.

DETAILED DESCRIPTION

The present disclosure relates to adhesive tapes used for making flying splices, and more particularly, to single-sided and double-sided adhesive tapes comprising a fastener that does not leave a residue on woven or nonwoven materials.

Unless otherwise indicated, all numbers expressing quantities of components, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Figure 1A:
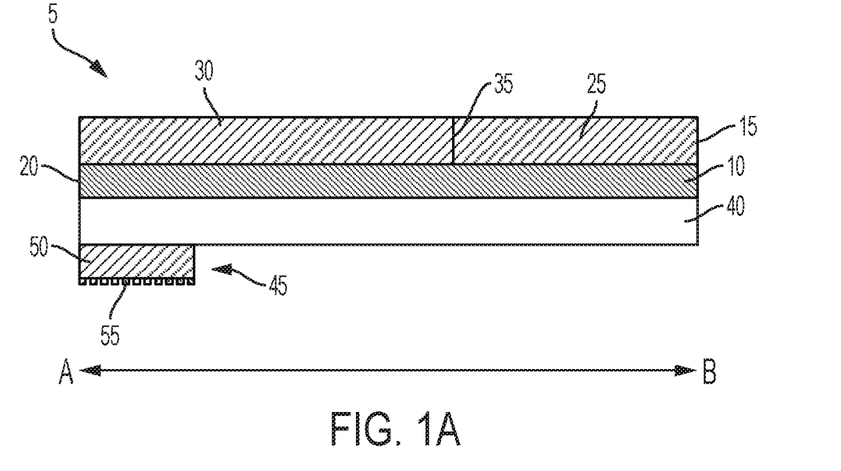
FIG. 1A illustrates a cross-section of an adhesive tape in accordance with certain embodiments of the present disclosure.
Figure 1B:
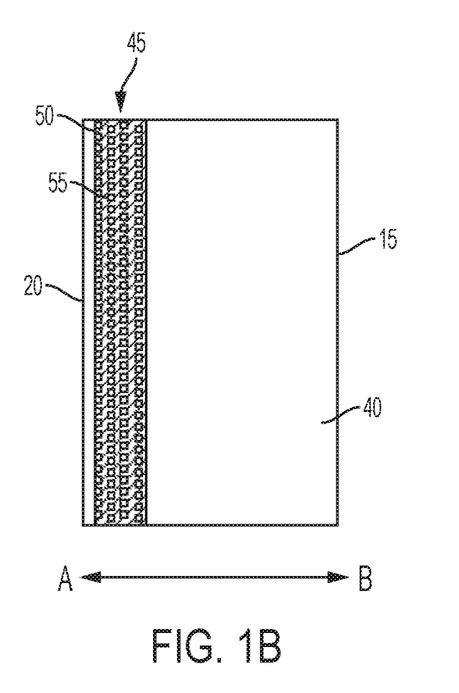
FIG. 1B illustrates a top-down perspective of the adhesive tape of FIG. 1A along line A-B in accordance with certain embodiments of the present disclosure.

FIG. 1A illustrates a cross-section of an adhesive tape 5 in accordance with certain embodiments of the present disclosure. FIG. 1B illustrates a bottom-up perspective of the underside of adhesive tape 5 along line A-B, as illustrated in FIG. 1A, in accordance with certain embodiments of the present disclosure. Adhesive tape 5 is a single-sided adhesive tape possessing one adhesive layer 10. Adhesive tape 5 comprises an adhesive layer 10 extending from a first lateral edge 15 to a second lateral edge 20. The adhesive of the adhesive layer 10 may be a rubber-base adhesive comprising high-tack and fast-wetting capability for woven and nonwoven substrates.

As illustrated, adhesive layer 10 is lined with a leading edge liner 25 and a contact side liner 30. Leading edge liner 25 extends from first lateral edge 15 to position 35, which is proximate first lateral edge 15. Contact side liner 30 extends from second lateral edge 20 to position 35.

A backing 40 is positioned adjacent to adhesive layer 10 and on the opposing side of adhesive layer 10 relative to the leading edge liner 25 and contact side liner 30. The backing 40 may be made of a polyester or any paper-like material sufficient for carrying the adhesive layer 10. In some optional embodiments, the backing 40 may be repulpable. In further optional embodiments, the backing 40 may be treated, for example, by increasing the surface energy of the backing material to better promote adhesion of the adhesive layer 10 on the backing 40.

On the side of the backing 40 opposite the adhesive layer 10, a fastener 45 may be positioned proximate the second lateral edge 20. The fastener 45 may be used to secure a new roll of material (illustrated in FIG. 3 below) from unwinding prematurely by closing the leading edge of the new roll of material. Generally, the fastener 45 may fasten the leading edge of the top winding of the new roll to the second from the top winding of the new roll. After the flying splice is made, the fastener 45 may then release the top winding from the second from the top winding when the leading edge is unwound from the new roll (as illustrated below). The fastener 45 is a non-adhesive mechanical fastener and does not comprise an adhesive or splittable adhesive system for its fastening mechanism, and therefore, an adhesive residue does not remain on the second from the top winding when released.

Generally, the fastener 45 may comprise two components—a fastener base 50, and a fastening mechanism 55. The fastener base 50 adheres the fastener 45 to backing 40. An adhesive or any such suitable means may be used to secure the fastener base 50 to the backing 40. The attachment force used to secure the fastener base 50 should be greater than the attachment force used to fasten the fastening mechanism 55 to the second from the top winding, such that the fastener 45 does not separate from the backing 40 when the leading edge is unwound and a portion of the fastener 45 remains fastened to the second from the top winding instead of releasing the second from the top winding from the fastening mechanism 55. The fastening mechanism 55 utilizes a mechanical fastening method that physically fastens the substrate and does not chemically bond or chemically interact with the substrate. As mentioned above, the fastening mechanism 55 does not comprise adhesives or any chemical treatment which may leave a residue on the second from the top winding. The fastening mechanism 55 may generally comprise a plastic formed into specific shaped patterns used to form a nonpermanent and releasable attachment to woven and nonwoven materials without leaving a residue or a portion of the fastening mechanism 55 on said materials.

Figure 2A:
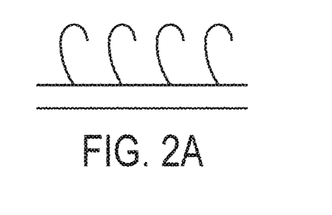
FIG. 2A illustrates a cross-section of a fastening mechanism comprising a single-sided hook shape in accordance with certain embodiments of the present disclosure.
Figure 2B:
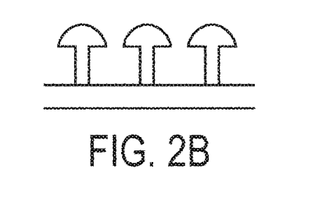
FIG. 2B illustrates a cross-section of a fastening mechanism comprising a half-sphere capped shape in accordance with certain embodiments of the present disclosure.
Figure 2C:
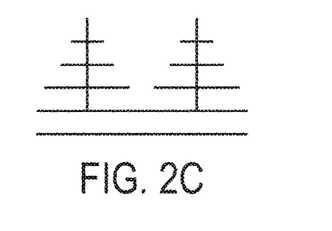
FIG. 2C illustrates a cross-section of a fastening mechanism comprising a branched tree shape in accordance with certain embodiments of the present disclosure.
Figure 2D:
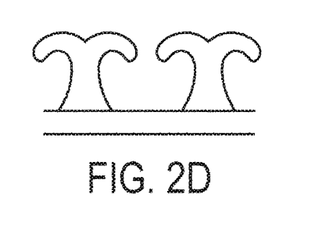
FIG. 2D illustrates a cross-section of a fastening mechanism comprising a double-sided hook shape in accordance with certain embodiments of the present disclosure.
Figure 2E:
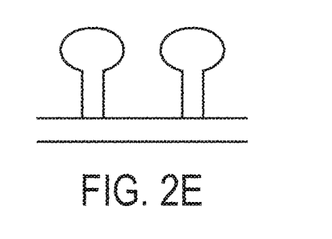
FIG. 2E illustrates a cross-section of a fastening mechanism comprising a sphere capped shape in accordance with certain embodiments of the present disclosure.
Figure 2F:
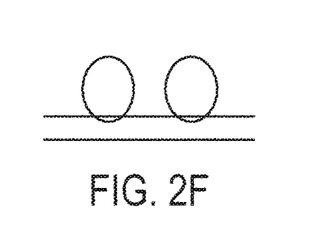
FIG. 2F illustrates a cross-section of a fastening mechanism comprising an open-loop shape in accordance with certain embodiments of the present disclosure.
Figure 2G:
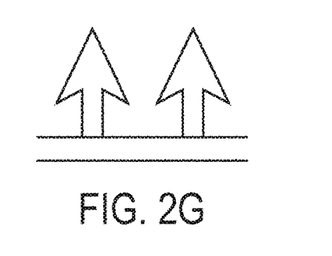
FIG. 2G illustrates a cross-section of a fastening mechanism comprising an arrow shape in accordance with certain embodiments of the present disclosure.
Figure 2H:
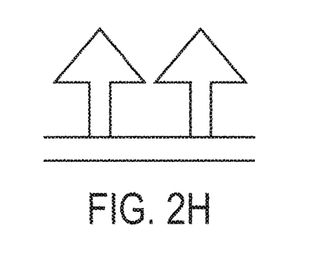
FIG. 2H illustrates a cross-section of a fastening mechanism comprising a triangle capped shape in accordance with certain embodiments of the present disclosure.

FIGS. 2A-2H illustrate eight non-limiting embodiments of the shaped plastics. FIG. 2A illustrates a cross-section of a fastening mechanism 55 comprising a single-sided hook shape. FIG. 2B illustrates a cross-section of fastening mechanism 55 comprising a half-sphere capped shape. FIG. 2C illustrates a cross-section of a fastening mechanism 55 comprising a branched tree shape. FIG. 2D illustrates a cross-section of a fastening mechanism comprising a double-sided hook shape. FIG. 2E illustrates a cross-section of a fastening mechanism 55 comprising a sphere capped shape. FIG. 2F illustrates a cross-section of a fastening mechanism 55 comprising an open-loop shape. FIG. 2G illustrates a cross-section of a fastening mechanism 55 comprising an arrow shape. FIG. 2H illustrates a cross-section of a fastening mechanism 55 comprising a triangle capped shape. The example shapes disclosed herein are intended to be non-limiting, and the disclosure contemplates any shape sufficient for forming a nonpermanent and releasable attachment to woven and nonwoven materials without the use of materials that may leave a residue on said materials. Examples of plastics sufficient for forming the shaped patterns of the fastening mechanism 55 may include, but are not limited to, nylons, polyesters, polyurethanes, polyvinyl chloride, polypropylene, and any combinations thereof.

Figure 3:
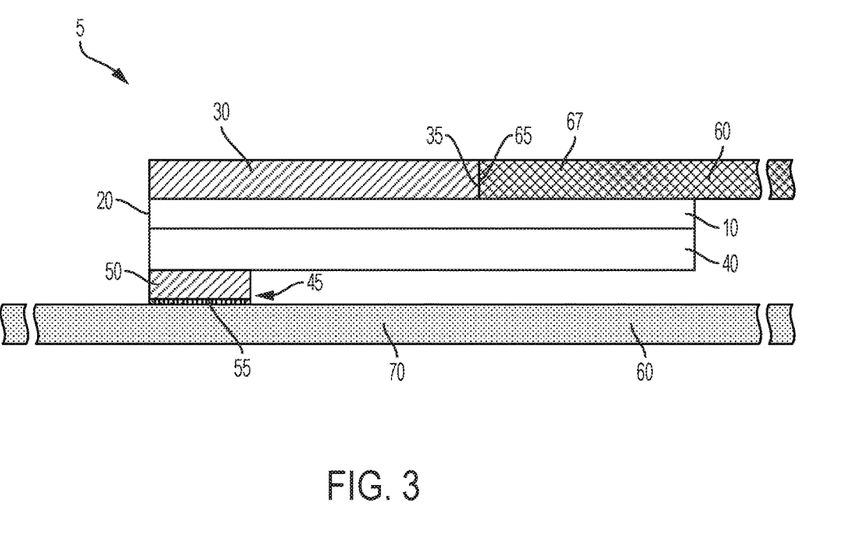
FIG. 3 illustrates a cross-section of the adhesive tape of FIG. 1A adhered to a new roll of material in accordance with certain embodiments of the present disclosure.

FIG. 3 illustrates a cross-section of adhesive tape 5 adhered to a new roll of material 60. As illustrated, the leading edge liner has been removed (i.e., leading edge liner 25, as illustrated in FIG. 1A), and the leading edge 65 of the new roll of material 60 is brought to a position adjacent or proximate to position 35. The leading edge 65 is adhered to adhesive tape 5 by the adhesive layer 10, a portion of which was exposed by the removal of the leading edge liner, discussed above.

The second from the top winding 70 of the new roll of material 60 is affixed to the fastening mechanism 55 of the fastener 45. As such, premature unwinding of the leading edge 65 of the top winding 67 from the new roll of material 60 may be prevented when the new roll of material 60 is accelerated. With adhesive tape 5 adhered to both the leading edge 65 and the second from the top winding 70 of the new roll of material 60, the new roll of material 60 may be brought to contact with a moving and unwinding expiring roll of material (i.e., expiring roll of material 75, as illustrated below in FIG. 4). When said contact is desired, the contact side liner 30 may be removed prior, which may expose the remaining portion of the adhesive layer 10.

Figure 4:
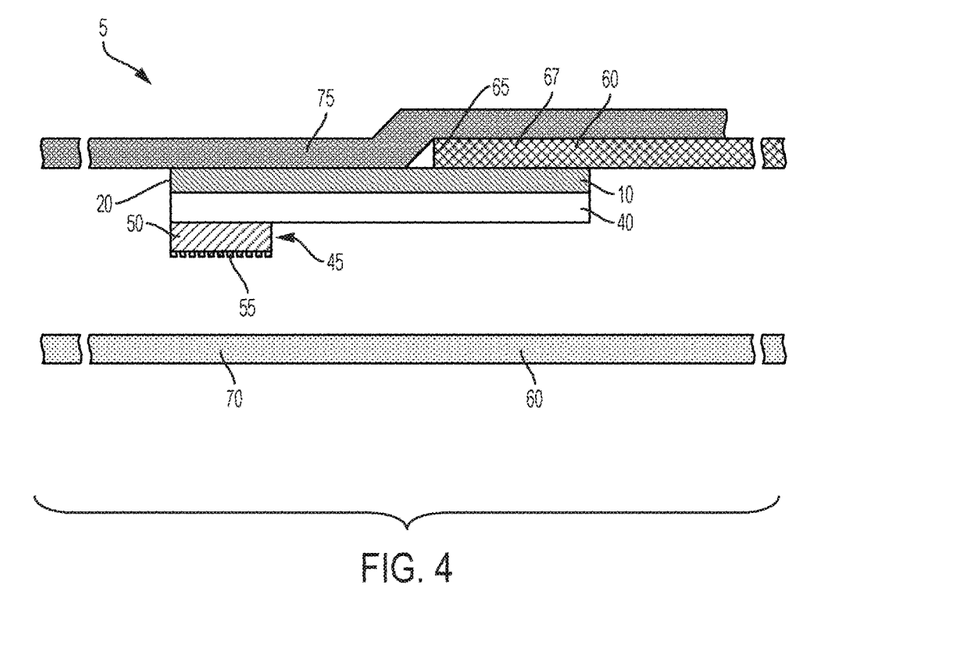
FIG. 4 illustrates a cross-section of the adhesive tape of FIG. 1A when used to provide a flying splice of a new roll of material to an expiring roll of material in accordance with certain embodiments of the present disclosure.

FIG. 4 illustrates a cross-section of adhesive tape 5 used to provide a flying splice of a new roll of material 60 to an expiring roll of material 75. The new roll of material 60 may comprise a first length of material that is spliced to a second length of material from the expiring roll of material 75 to provide a spliced roll of material. As was illustrated by FIG. 3, the adhesive tape 5 was adhered to both the leading edge 65 and the second from the top winding 70 of the new roll of material 60. The new roll of material 60 may then be sufficiently resistant to centrifugal force and to wind such that it could be brought to rotational speed with the expiring roll of material 75 after the contact side liner is removed (i.e., contact side liner 30, as illustrated in FIG. 3). Contact between the new roll of material 60 and the expiring roll of material 75 may thus be made. As illustrated by FIG. 4, at said point of contact the adhesive layer 10 may adhere to the expiring roll of material 75 to provide the flying splice as illustrated. After the flying splice is made, the top winding 67 of the new roll of material 60 is detached from the second from the top winding 70 of the new roll of material 60 when the force of the unwinding of the top winding 67 of the new roll of material 60 pulls the fastening mechanism 55 free from the second from the top winding 70. As the fastening mechanism 55 does not rely on materials which may leave a residue to chemically bond the second from the top winding 70, there is no residue left on the second from the top winding 70 by the fastening mechanism 55. As such, a flying splice may be provided without the need to discard the material of the second from the top winding 70.

Figure 5A:
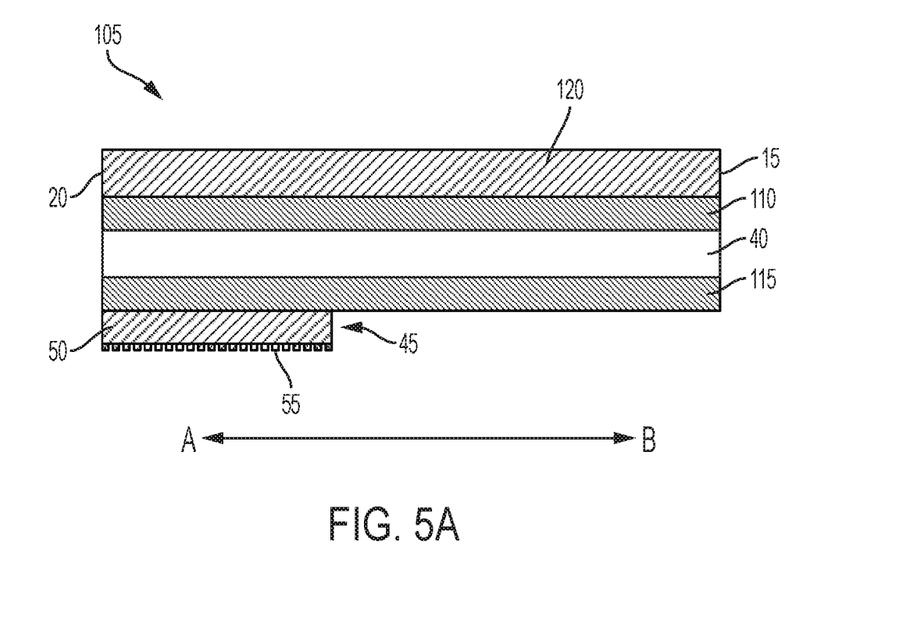
FIG. 5A illustrates a cross-section of an embodiment of an integrated double-sided adhesive tape in accordance with certain embodiments of the present disclosure.
Figure 5B:
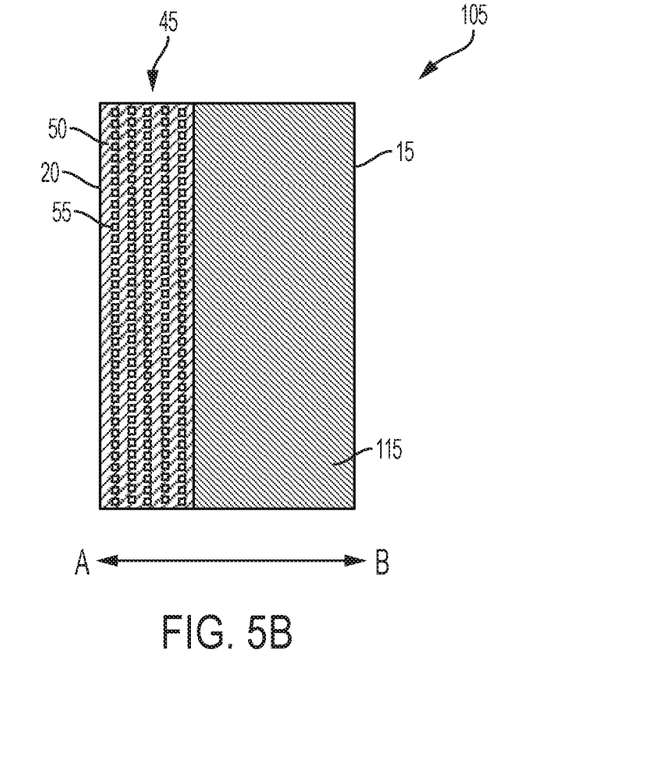
FIG. 5B illustrates a top-down perspective of the adhesive tape of FIG. 5A along line A-B in accordance with certain embodiments of the present disclosure.

FIG. 5A illustrates a cross-section of another embodiment of an adhesive tape, generally 105, in accordance with certain embodiments of the present disclosure. FIG. 5B illustrates a top-down perspective of adhesive tape 105 along line A-B as illustrated in FIG. 5A in accordance with certain embodiments of the present disclosure. Adhesive tape 105 is a double-sided adhesive tape possessing two layers of adhesive. The first adhesive layer 110 is positioned on the upper or top side of backing 40 (i.e., the outward facing side of the roll of adhesive tape 105) and extending from a first lateral edge 15 to a second lateral edge 20. Adhesive tape 105 further comprises a second adhesive layer 115 adjacent to, and on the under or lower side of backing 40 (i.e., the inward facing side of the roll of adhesive tape 105) and extending from the first lateral edge 15 to the second lateral edge 20. The adhesives of the first adhesive layer 110 and the second adhesive layer 120 may be the same or different. The properties of the adhesives of the first adhesive layer 110 and the second adhesive layer 120 may be selected to provide specific desirable properties such as a desirable value for tack, shear strength, etc. As illustrated, the first adhesive layer 110 is lined with a release liner 120 which may be removed to expose the first adhesive layer 110 when a flying splice is to be provided.

Figure 6:
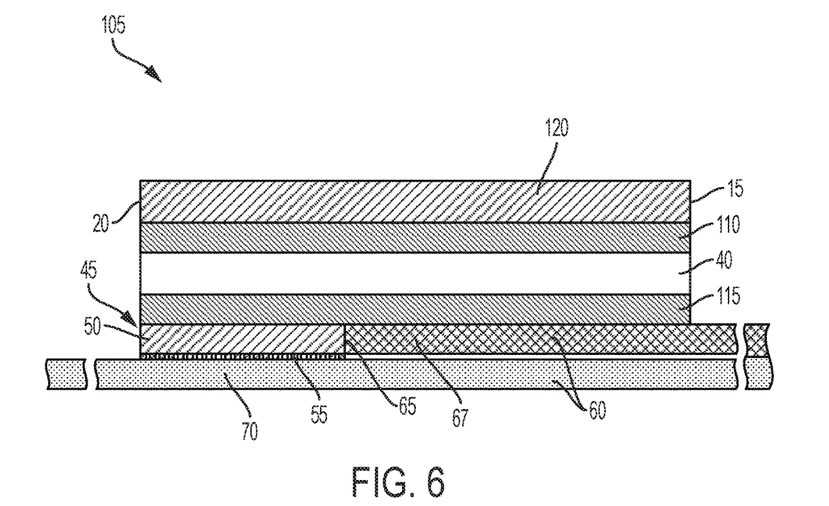
FIG. 6 illustrates a cross-section of the adhesive tape of FIG. 5A adhered to a new roll of material in accordance with certain embodiments of the present disclosure.

On the side of the second adhesive layer 115 opposite the backing 40, a fastener 45 may be positioned proximate the second lateral edge 20. The fastener 45 is analogous in function and design as described above in FIGS. 1A-4 and may be used to secure a new roll of material (i.e., new roll of material 60, as illustrated in FIG. 6 below) from premature unwinding by closing the leading edge of the new roll. As described above, the fastener 45 is a non-adhesive mechanical fastener and may comprise two components, a fastener base 50 and a fastening mechanism 55. Unlike the embodiment described above, the fastener base 50 adheres the fastener 45 to the second adhesive layer 115 instead of the backing 40. Fastener base 50 may be secured to second adhesive layer 115 with the adhesive present on second adhesive layer 115. The attachment force used to secure the fastener base 50 should be greater than the force used to unfasten the fastening mechanism 55 from the second from the top winding (i.e., second from the top winding 70, as illustrated in FIG. 6 below), such that the fastener 45 does not separate from the backing 40 when the leading edge of the top winding (i.e., leading edge 65 of the top winding 67, as illustrated in FIG. 6 below) is unwound, and a portion of the fastener 45 remains fastened to the second from the top winding instead of releasing the second from the top winding from the fastening mechanism 55. As mentioned above, the fastening mechanism 55 does not comprise adhesives or any chemical treatment which may leave a residue on the second from the top winding. The fastening mechanism 55 utilizes a mechanical fastening method that physically fastens the substrate and does not chemically bond or chemically interact with the substrate. The fastening mechanism 55 may generally comprise a plastic formed into specific shaped patterns used to form a nonpermanent and releasable attachment to woven and nonwoven materials without leaving a residue or a portion of the fastening mechanism 55 on said materials.

FIG. 6 illustrates a cross-section of adhesive tape 105 adhered to a new roll of material 60. When desired for use, a strip of adhesive tape 105 may be removed from a roll or dispenser of the adhesive tape 105. The exposed portion of second adhesive layer 115 that is not covered by fastener 45 may be placed on top of the top winding 67 of the new roll of material 60 at or proximate to the leading edge 65. When adhered to the leading edge 65 of the new roll of material 60, the fastener 45 may be pressed on to and secured to the second from the top winding 70 of the new roll of material 60 to fasten the leading edge 65 to the second from the top winding 70 so that the leading edge 65 does not prematurely detach when the new roll of material 60 is accelerated. The new roll of material 60 may then be sufficiently resistant to centrifugal force and to wind such that it could be brought to rotational speed with an expiring roll of material in a flying splice operation. Prior to said contact the release liner 120 may be removed, exposing first adhesive layer 110.

Figure 7:
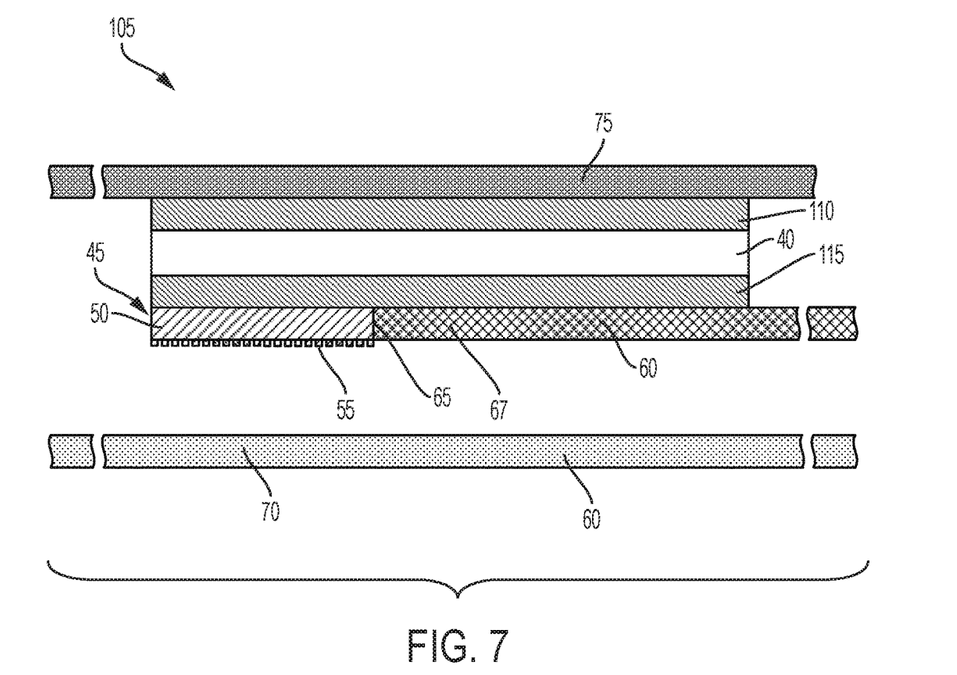
FIG. 7 illustrates a cross-section of the adhesive tape of FIG. 5A when used to make a flying splice of a new roll of material to an expiring roll of material in accordance with certain embodiments of the present disclosure.

FIG. 7 illustrates a cross-section of adhesive tape 105 used to make a flying splice of a new roll of material 60 to an expiring roll of material 75. The new roll of material 60 may comprise a first length of material that is spliced to a second length of material from the expiring roll of material 75 to provide a spliced roll of material. With the adhesive tape 105 adhered to the new roll of material 60, the release liner (i.e., release liner 120, as illustrated in FIG. 6) may be removed to expose the first adhesive layer 110, and contact between the adhesive tape 105 and the expiring roll of material 75 may be made. At the point of said contact, the first adhesive layer 110 may adhere the expiring roll of material 75 to the adhesive tape 105 to provide the flying splice. After the flying splice is made, the top winding 67 of the new roll of material 60 may be detached from the second from the top winding 70 when the force of the unwinding of the top winding 67 pulls the fastening mechanism 55 free from the second from the top winding 70. As the fastening mechanism 55 does not rely on materials that leave behind residues or portions of the fastening mechanism 55 in order to bond the second from the top winding 70, a flying splice may be provided without the need to discard the material of the second from the top winding 70.

The embodiments described herein may be of particular benefit in applications using woven and nonwoven substrates. Examples of woven and nonwoven substrates may include, but are not limited to, textiles, cloth, fabric, wool, silk, cotton, flax, jute, nylon, polyester, acrylic, fur, spunlaid materials, spun-melt materials, spun-melt-spun materials, rayon, polyethylene terephthalate fibers, polypropylene fibers, staple nonwovens, flashspun materials, air-laid paper, fibrillated materials, laminated materials, flexible laminated materials, or combinations thereof.

One or more illustrative examples incorporating the embodiments disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations may be made herein without departing from the spirit and scope of the disclosure as defined by the following claims.

What is claimed is:

1. A method of providing a flying splice on a fibrous material, the method comprising:
   providing an adhesive tape comprising:
      an adhesive layer,
      a backing adjacent to the adhesive layer, and
      a non-adhesive mechanical fastener;
   contacting the adhesive layer to a leading edge of a top winding of a first roll of the fibrous material;
   fastening the non-adhesive mechanical fastener to a second from the top winding of the first roll of the fibrous material;
   contacting the adhesive layer with an unwinding second roll of the fibrous material without stopping or slowing the unwinding of the second roll of the fibrous material; and
   releasing the non-adhesive mechanical fastener from the second from the top winding of the first roll of the fibrous material; wherein the released non-adhesive mechanical fastener does not leave a residue on the second from the top winding of the first roll of the fibrous material.

2. The method of claim 1, wherein the non-adhesive mechanical fastener comprises a shaped plastic.

3. The method of claim 2, wherein the plastic of the shaped plastic is selected from the group consisting of nylons, polyesters, polyurethanes, polyvinyl chloride, polypropylene and any combination thereof.

4. The method of claim 2, wherein the shape of the shaped plastic is selected from the group consisting of a single-sided hook shape, a half-sphere capped shape, a branched tree shape, a double-sided hook shape, a sphere capped shape, an open-loop shape, an arrow shape, a triangle capped shape, and any combination thereof.

5. The method of claim 1, wherein the fibrous material is selected from the group consisting of textiles, cloth, fabric, wool, silk, cotton, flax, jute, nylon, polyester, acrylic, fur, spunlaid materials, spun-melt materials, spun-melt-spun materials, rayon, polyethylene terephthalate fibers, polypropylene fibers, staple nonwovens, flashspun materials, air-laid paper, fibrillated materials, and any combination thereof.

6. The method of claim 1, further comprising a leading edge liner and a contact side liner; wherein the leading edge liner and the contact side liner are adjacent to and covering at least a portion of the adhesive layer.

7. A method of providing a flying splice on a fibrous material, the method comprising:
   providing an adhesive tape comprising:
      a first adhesive layer,
      a second adhesive layer,
      a backing adjacent to the first adhesive layer and the second adhesive layer, and
      a non-adhesive mechanical fastener adjacent to the second adhesive layer;
   contacting the second adhesive layer to a leading edge of a top winding of a first roll of the fibrous material;
   fastening the non-adhesive mechanical fastener to a second from the top winding of the first roll of the fibrous material;
   contacting the first adhesive layer with an unwinding second roll of the fibrous material without stopping or slowing the unwinding of the second roll of the fibrous material; and
   releasing the non-adhesive mechanical fastener from the second from the top winding of the first roll of the fibrous material; wherein the released non-adhesive mechanical fastener does not leave a residue on the second from the top winding of the first roll of the fibrous material.

8. The method of claim 7, wherein the non-adhesive mechanical fastener comprises a shaped plastic.

9. The method of claim 8, wherein the plastic of the shaped plastic is selected from the group consisting of nylons, polyesters, polyurethanes, polyvinyl chloride, polypropylene, and any combination thereof.

10. The method of claim 8, wherein the shape of the shaped plastic is selected from the group consisting of a single-sided hook shape, a half-sphere capped shape, a branched tree shape, a double-sided hook shape, a sphere capped shape, an open-loop shape, an arrow shape, a triangle capped shape, and any combination thereof.

11. The method of claim 7, wherein the fibrous material is selected from the group consisting of textiles, cloth, fabric, wool, silk, cotton, flax, jute, nylon, polyester, acrylic, fur, spunlaid materials, spun-melt materials, spun-melt-spun materials, rayon, polyethylene terephthalate fibers, polypropylene fibers, staple nonwovens, flashspun materials, airlaid paper, fibrillated materials, and any combination thereof.

* * * * *